(12) United States Patent
Bersell et al.

(10) Patent No.: US 10,722,846 B2
(45) Date of Patent: *Jul. 28, 2020

(54) METHOD AND SYSTEM FOR CLEANING MEMBRANE FILTERS

(71) Applicant: Meurer Research, Inc., Golden, CO (US)

(72) Inventors: Donald Floyd Bersell, Denver, CO (US); Charles Lonnie Meurer, Golden, CO (US)

(73) Assignee: Meurer Research, Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,325

(22) Filed: May 24, 2019

(65) Prior Publication Data
US 2019/0275467 A1 Sep. 12, 2019

Related U.S. Application Data

(63) Continuation of application No. 16/131,168, filed on Sep. 14, 2018, now Pat. No. 10,307,714, which is a
(Continued)

(51) Int. Cl.
B01D 61/20 (2006.01)
B01D 63/08 (2006.01)
(Continued)

(52) U.S. Cl.
CPC .......... B01D 65/04 (2013.01); B01D 61/20 (2013.01); B01D 63/082 (2013.01); B01D 65/02 (2013.01);
(Continued)

(58) Field of Classification Search
CPC combination set(s) only.
See application file for complete search history.

(56) References Cited

U.S. PATENT DOCUMENTS 4,200,531 A 4/1980 Yanagi
4,526,682 A 7/1985 Wallace
(Continued)

FOREIGN PATENT DOCUMENTS

DE 4421639 1/1996
DE 19527544 1/1997
(Continued)

OTHER PUBLICATIONS

RuiQiLong Wire Mesh Co., LTD, Wedge Wire Screen, Jan. 22, 2011, pp. 1-3 (Year: 2011).*
(Continued)

Primary Examiner — Patrick Orme
Assistant Examiner — Michael J An
(74) Attorney, Agent, or Firm — Sheridan Ross P.C.

(57) ABSTRACT

The disclosure relates to a system and method for cleaning filters, such as membrane filters. More particularly, a method and system are disclosed for retaining a plurality of small particulates, preferably in the shape of beads, which contact sludge or other despots on the membrane filters to remove unwanted debris that would otherwise form on the cleaning filters. In various embodiments, the plurality of small particulates are retained in a permeable enclosure formed of wedgewire.

15 Claims, 9 Drawing Sheets

Related U.S. Application Data continuation of application No. 15/817,798, filed on Nov. 20, 2017, now Pat. No. 10,080,994, which is a continuation of application No. 13/717,494, filed on Dec. 17, 2012, now Pat. No. 9,821,275.

(60) Provisional application No. 61/576,662, filed on Dec. 16, 2011.

(51) Int. Cl.
  B01D 65/02 (2006.01)
  B01D 65/04 (2006.01)
  C02F 1/44 (2006.01)

(52) U.S. Cl.
  CPC .......... *C02F 1/44* (2013.01); *B01D 2313/20* (2013.01); *B01D 2315/06* (2013.01); *B01D 2321/2091* (2013.01); *C02F 2303/16* (2013.01)

(56) References Cited

U.S. PATENT DOCUMENTS

| | | | |
|---|---|---|---|
| 4,661,252 | A | 4/1987 | Burgess |
| 5,248,424 | A | 9/1993 | Cote et al. |
| 5,482,625 | A * | 1/1996 | Shimizu ............... B01D 61/18 210/231 |
| 6,277,209 | B1 | 8/2001 | Yamada et al. |
| 6,280,626 | B1 | 8/2001 | Miyashita et al. |
| 6,319,411 | B1 | 11/2001 | Cote |
| 6,669,881 | B2 | 12/2003 | Saier |
| 7,143,781 | B2 | 12/2006 | Boner et al. |
| 7,435,351 | B2 | 10/2008 | Boner et al. |
| 7,867,392 | B2 | 1/2011 | Lee et al. |
| 7,892,430 | B2 | 2/2011 | Voigt et al. |
| 8,580,115 | B2 | 11/2013 | Krause et al. |
| 9,821,275 | B2 * | 11/2017 | Bersell ................. B01D 65/04 |
| 10,080,994 | B2 * | 9/2018 | Bersell ................. B01D 65/04 |
| 10,307,714 | B2 * | 6/2019 | Bersell ................. B01D 65/04 |
| 2002/0038782 | A1 | 4/2002 | Kim et al. |
| 2003/0004084 | A1 * | 1/2003 | Sato ..................... B01D 61/04 510/403 |
| 2004/0188339 | A1 | 9/2004 | Murkute et al. |
| 2008/0105615 | A1 * | 5/2008 | Noguchi ............... B01D 65/02 210/630 |
| 2008/0156730 | A1 | 7/2008 | Heinen |
| 2008/0164208 | A1 | 7/2008 | Doyen et al. |
| 2008/0190849 | A1 | 8/2008 | Vuong |
| 2009/0293917 | A1 | 12/2009 | Livingston et al. |
| 2010/0051545 | A1 | 3/2010 | Johnson et al. |
| 2010/0313907 | A1 | 12/2010 | Sinha et al. |
| 2011/0024355 | A1 | 2/2011 | Mansouri et al. |
| 2011/0042308 | A1 * | 2/2011 | Krause ................. B01D 65/02 210/615 |
| 2011/0042312 | A1 | 2/2011 | Ginzburg et al. |
| 2011/0049038 | A1 | 3/2011 | Aerts et al. |
| 2011/0127206 | A1 | 6/2011 | Meyer-Blumenroth et al. |
| 2011/0240535 | A1 | 10/2011 | Pehrson et al. |
| 2012/0000851 | A1 | 1/2012 | Vuong et al. |
| 2013/0043189 | A1 * | 2/2013 | Krause ................. B01D 61/08 210/650 |
| 2014/0151299 | A1 * | 6/2014 | Downey ............... B01D 65/02 210/636 |

FOREIGN PATENT DOCUMENTS

| | | | |
|---|---|---|---|
| DE | 19538014 | | 4/1997 |
| DE | 29600692 | | 5/1997 |
| DE | 19730441 | | 1/1999 |
| DE | 10220916 | | 11/2003 |
| DE | 202004002835 | | 4/2004 |
| DE | 102004008814 | | 9/2005 |
| DE | WO2009/132797 A1 * | 11/2009 | .......... B01D 65/02 |
| DE | WO2011137990 * | 11/2011 | .......... B01D 65/08 |
| EP | 0951502 | | 10/1999 |
| EP | 1734011 | | 12/2006 |
| JP | H08-155275 | | 6/1996 |
| JP | H11-128692 | | 5/1999 |
| JP | 2951189 | | 9/1999 |
| WO | WO 98/30624 | | 7/1998 |
| WO | WO 2005/082496 | | 9/2005 |
| WO | WO 2006/045440 | | 5/2006 |
| WO | WO 2007/036332 | | 4/2007 |
| WO | WO 2009/085252 | | 7/2009 |
| WO | WO 2009/109308 | | 9/2009 |
| WO | WO 2009/127345 | | 10/2009 |
| WO | WO 2011/025698 | | 3/2011 |
| ZA | 98/00158 | | 7/1998 |

OTHER PUBLICATIONS

Downing et al. "Total nitrogen removal in a hybrid, membrane-aerated activated sludge process," Water Research, Aug. 2008, vol. 42, No. 14, pp. 3697-3708.

Elimelech et al. "The Future of Seawater Desalination: Energy, Technology, and the Environment," Science, Aug. 5, 2011, vol. 333, No. 6043, pp. 712-717.

Geise et al. "Water Permeability and Water/Salt Selectivity Tradeoff in Polymers for Desalination," Journal of Membrane Science, 2011, vol. 369, pp. 130-138.

Klegraf, "Mastery of Fouling and Scaling on Submerged Filtration Systems in Membrane Aeration Plants," VA TECH WABAG, Jun. 21, 2005, retrieved from <http://www.wabag.com/wp-content/uploads/2012/04/Membranbelebung.pdf> (with English machine translation), 14 pages.

Official Action for Canadian Patent Application No. 2,798,889 dated Jan. 20, 2014, 5 pages.

Notice of Allowance (with English summary) for Mexican Patent Application No. MX/a/2012/014889 dated Jul. 18, 2016, 2 pages.

Official Action for U.S. Appl. No. 13/717,494, dated Mar. 12, 2015, 18 pages.

Official Action for U.S. Appl. No. 13/717,494, dated Sep. 24, 2015, 14 pages.

Official Action for U.S. Appl. No. 13/717,494, dated Apr. 22, 2016, 18 pages.

Official Action for U.S. Appl. No. 13/717,494, dated Sep. 23, 2016, 19 pages.

Official Action for U.S. Appl. No. 13/717,494, dated Feb. 1, 2017, 16 pages.

Official Action for U.S. Appl. No. 13/717,494, dated Jun. 20, 2017, 6 pages.

Notice of Allowance for U.S. Appl. No. 13/717,494, dated Jul. 20, 2017, 6 pages.

Notice of Allowance for U.S. Appl. No. 15/817,798, dated May 17, 2018, 16 pages.

Notice of Allowance for U.S. Appl. No. 16/131,168, dated Jan. 23, 2019 16 pages.

* cited by examiner

TABLE 1

| | Criteria for particle (granules) selection |
|---|---|
| Density | 1-1.5 kg/dm$^3$, the particles circulate by their upward movement being effected by air bubbles in combination with the liquid streaming and their downward movement being effected gravity. |
| Diameter | <5mm, such that the passage between two adjacent membranes is possible without problems. |
| Shape | Spherical, lenticular, cylindrical, low roughness |
| Material | Non-porous, biologically resistant, inert |

FIG. 7

METHOD AND SYSTEM FOR CLEANING MEMBRANE FILTERS

CROSS-REFERENCE TO RELATED APPLICATIONS

This application is a continuation of U.S. patent application Ser. No. 16/131,168, filed Sep. 14, 2018 (now U.S. Pat. No. 10,307,714, issued Jun. 4, 2019), which is a continuation of U.S. patent application Ser. No. 15/817,798, filed Nov. 20, 2017 (now U.S. Pat. No. 10,080,994, issued Sep. 25, 2018), which is a continuation of U.S. patent application Ser. No. 13/717,494, filed Dec. 17, 2012 (now U.S. Pat. No. 9,821,275, issued Nov. 21, 2017), which claims priority to U.S. Provisional Patent Application No. 61/576,662, entitled "Method and System for Cleaning Membrane Filters," filed on Dec. 16, 2011, which is incorporated by reference herein in its entirety.

FIELD OF THE INVENTION

The present invention is directed to the cleaning of membrane filters, and more particularly, to a method and system that retains a plurality of small particulates, such as particulates generally in the shape of beads, that contact membrane filters while in a solution so as to remove debris that would otherwise form on said filters, with said plurality of small particulates being retained in a permeable enclosure.

BACKGROUND

Membrane water filtration is well known and is increasingly popular due to its extreme efficiency in clarifying water and removing undesired contaminants and components typically encountered in municipal water treatment facilities. A particular membrane filtration system is offered by Microdyn-Nadir GmbH. U.S. Pat. No. 7,892,430, U.S. Patent Application Publication Nos. 2011/0042308, 2011/0042312, 2011/0049038, 2011/0127206, and International Application PCT/EP2009/002944 are incorporated herein by this reference in their entireties in order to provide support for the basic membrane filtration technologies involved in practicing the best mode of the present invention.

A particular problem encountered by use of membrane filters, however, is the eventual build up of undesired debris and contaminates on the surface of the membrane filter. Conventionally, such debris and contaminants must be removed through various means, including chemical soaking of the membranes in chlorine solutions. This necessitates taking the filters out of use and commission during the cleaning process, which can last for a significant amount of time and thus impacts the commercial use and nature of membrane filtration technologies. There is therefore a long felt, but unsolved, need for a method and system for cleaning membrane filters while such filters are in use performing their water filtration functions.

These systems, however, are known to cause fouling, discoloration, and general deterioration of various filtration elements, which in turn have a negative impact on the water or wastewater application in which the filtration elements reside. Furthermore, prior art systems often rely on chemical processes to address problems associated with the prior art, which have a negative environmental impact and may cause other undesirable consequences. Additionally, such processes are known to be expensive and require significant time and labor investments.

SUMMARY

The use of membrane bioreactors (MBR) and filtration membrane modules for treating raw water or wastewater is known in principle. The membranes used for filtration consist, for example, of polymeric materials such as polyethylene, polypropylene, polyethersulfone, polyvinylidene fluoride or similar polymers. The pore sizes of the membranes are for these uses in the range between 0.001 and 1 µm. In a membrane bioreactor (MBR), the activation method for wastewater treatment with separation of the biomass from the purified water is carried out using ultra- or microfiltration membranes. In most applications, the polymer membranes are immersed directly in the activated sludge and the treated wastewater is drawn off by means of vacuum suction or flows off under the influence of gravity.

In the MBR method, the wastewater is physically, chemically and biologically treated in a plurality of steps until it reaches the membrane. By means of mechanical and physical pretreatments, the wastewater is freed from particles, fibers and coarse matter. In the coarse filtration, large particles which could cause damage to the membranes are removed by grills and screens. In the MBR method, fine screens in a size range of 0.05-3 mm are customarily used as prefiltration. Additionally, the wastewater is freed from heavy particles (e.g., sand) and oils and fats by a sand and fat trap.

In an embodiment, the use of an enclosure screen around the membrane eliminates or reduces the need for filtration in other treatment tanks. The enclosure screen may act as the final step to remove large particles before the water reaches the filtration membrane. In another embodiment, the enclosure screen acts as protection for the membrane filter because it prevents large particles from reaching and damaging the membrane filter.

In a further treatment step of the wastewater treatment, the wastewater is biologically and chemically treated. In the activation tank there is situated the activated sludge (biomass) which contains in its biomass the enzymatic potential for conversion of the high-molecular-weight pollutants in such a manner that these can be eliminated. The dissolved materials are utilized by the biomass either for the cell structure or for energy production with oxygen consumption. The resultant oxygen consumption must be covered by sufficient oxygen supply, for which reason activation tanks are provided with aeration appliances. A precondition for the functioning of the method is that the biomass remains in the system. Therefore, the biomass is separated off from the purified wastewater by membrane filtration and recirculated to the activation tank. Overgrown activated sludge is removed as excess sludge. Before the biomass is separated from the water, further chemical treatments proceed. In combination with a filtration stage, various precipitants and flocculants such as, for example, iron chloride or polymers for removing colloidally and particularly dispersed liquid components are customarily used.

A substantial advantage of MBR systems is the solids-free effluent. This means, in addition, that no bacteria are found in the effluent of the membrane activation system and, even viruses may be separated off by sorption effects. The residual organic pollution is reduced thereby owing to the complete separation. The hygienically relevant guide values of the EU bathing water directive [75/160/EEC, 1975] are complied with using MBR. In addition, the solids-free effluent offers not only in the municipal sector but also in the industrial sector, a great potential for wastewater reuse. Here, by water recycling up to closed circulation of water large savings of water can be achieved. A further advantage is that in this method, owing to the adjustable high DM content and the omission of the clarifiers, only a very small space is required. Owing to the independence of the sedimentation behavior, the activated sludge concentration (biomass concentration, expressed as DM—dry matter) can be increased over conventional methods. Membrane bioreactors are customarily operated at DM concentrations of 8 to 15 g/l. Compared with the conventional activation method, the reactor volume of a membrane bioreactor can be reduced, in such a manner that higher volumetric loadings are possible.

In the case of the membrane bioreactor method which is based generally on the aerobic activation method that is combined with a membrane filtration unit, the biomass is recirculated as concentrate over the membrane filtration unit, while the purified water is separated off as filtration permeate.

A problem in the use of membrane filters in the field of wastewater purification is what is termed "membrane fouling", which means that deposits form on the membranes, which deposits decrease the through-flow of the liquid that is to be purified.

DE 102 20 916 A1, which is hereby incorporated by reference in its entirety, describes a filtration appliance and also a membrane bioreactor which are operated under conditions in the filtration medium such that membrane fouling and deposits on the membrane surfaces are reduced. For this purpose the filtration device has hollow fiber membranes that are combined to form a fiber bundle for separating off the particles from a liquid, through which hollow fiber membranes liquid flows from the outside to the inside, and the filtered liquid is then taken off from at least one of the ends of the hollow fiber membranes. The filtration device, in addition, has a gas feed device in order to flush a gas over the exterior of the hollow fiber membranes. The fiber bundle in this case is wound round the outer peripheral surface of a carrier of the gas feed device.

EP 1 734 011 A1, which is hereby incorporated by reference in its entirety, discloses a method for improving the flow through a membrane bioreactor, in which a certain fraction of cationic, amphoteric and zwitterionic polymers or a combination thereof is added. The fraction of the added polymers is 10 to 2000 ppm, based on the entire membrane bioreactor volume. The polymers have a molecular weight of 10 000 to 20 000 000 Da. Adding the abovementioned polymer should reduce, especially inorganic fouling, which is formed by the precipitation of limestone $CaCo_3$ onto the membrane surfaces from the wastewater that is to be purified. The pH increases in the course of this, whereby in turn the precipitation is promoted by calcium phosphate and iron oxide. The precipitation of carbonates and phosphates in the wastewater proceeds in the form of small particles which are retained on the membrane surfaces.

Quite generally it is true that membrane fouling due to the precipitation of bioactive solids, colloids, accumulation of particles or macromolecular particles on the membrane surface leads to a decrease in the through-flow and permeability. It is difficult to describe the fouling process exactly owing to the heterogeneity of the activated sludge. Factors such as characteristics of the biomass, the extracellular polymeric substance, pore size, surface characteristics and membrane material, and also the construction of the filter membrane modules and the operating conditions influence fouling growth. For example, biofouling occurs most frequently on nanofiltration and reverse osmosis. The reason is that the membranes cannot be disinfected with chlorine in order to kill bacteria. The biofouling is principally due to the complex growth behavior of the bacteria. The type of microorganisms, the growth rate thereof and concentration on the membranes depend chiefly on the critical factors such as temperature, pH, the concentration of dissolved oxygen and the presence of organic and inorganic nutrients. It should be noted that the microorganisms pass into the filtration systems via air and/or water.

In the case of the filtration methods using membrane bioreactors, the growth of the fouling is customarily monitored in a plurality of steps.

1. Pretreatment of the raw water or wastewater, before inflow into the activated sludge, by means of various filtration steps as have already been mentioned above, for which purpose fine-mesh gratings having a mesh width of 0.5 to 3 mm are used.

2. In the "crossflow" method, the liquid that is to be purified is circulated along the membrane surface, for which purpose in the case of submerged modules, aeration devices are installed below the membrane modules, which aeration devices induce an upward streaming.

3. In some membrane modules a regular fully automatic backwash with permeate is performed, in such a manner that adhering particles/dirt are detached from the membrane surface and the pores are flushed open. A precondition is that the respective membrane is backwashable.

4. Chemical cleaning: the steps serve to prevent membrane fouling or at least decrease it. Chemical cleaning is necessary in order to remove the membrane fouling layers on and within the membranes. Chemical cleaning gives rise to considerable operating costs, since during the cleaning the membranes are out of operation and therefore additional membranes must be installed.

In addition, it is disadvantageous that the chemicals used such as, for example, sodium hydrochlorite NaOCl adversely affect the environment and contribute to the formation of absorbable organic halogen compounds (AOX). In addition, chemical cleaning requires an additional infrastructure (pumps, chemical containers, leak measuring devices, protective equipment, etc.) which is costly. Frequently, the membranes are chemically cleaned in a separate cleaning container in order to save chemicals, since these cleaning containers have small volumes. For this purpose the membrane module must be taken out of the filtration pond or tank and installed in the cleaning pond or tank. In the cleaning pond/tank, the chemical cleaning then takes place. The operating personnel must be trained to handle these chemicals and chemical cleaning is labor-intensive. Overall, chemical cleaning is a considerable cost and environmental factor.

For avoiding fouling layers, the publication of the company VA TECH WABAG GmbH, Vienna, editor: F. Klegraf with the title "Beherrschung von Fouling and Scaling an getauchten Filtrationssystemen in Membranbelebungs-anlagen" [Managing fouling and scaling on submerged filtration systems in membrane activation systems], which is hereby incorporated by reference in its entirety, describes the use of abrasively acting inert inorganic porous materials which can detach deposits on the surface of the membranes by long-term action. This use is not uncontroversial, since it must be feared that the abrasive forces not only erode the deposits, but also damage the sensitive surfaces of the membranes. As an inert abrasive material, expanded clay is mentioned which is introduced into the reactor. The expanded clay is retained in the reactor by screens. The turbulence introduced into the reactor with the flushing air is sufficient to homogenize the expanded clay in the system. Immediately after charging the reactor with expanded clay, the increase in filtration performance can be measured and by careful increasing of the expanded clay concentration in the activated sludge, 75% of the preset value of the filtration performance can be achieved after an experimental time of 40 days. Further increase of the expanded clay concentration in the reactor is not accompanied by any lasting improvement of the filtration results. The density of the porous expanded clay increases with time owing to water absorption. The expanded clay particles become heavier thereby and settle within the reactor and circulate only to a small extent as a result of the liquid streaming. In order to stimulate the circulation of the expanded clay particles, relatively large amounts of compressed air are then necessary but owing to the increased feed of compressed air into the liquids that are to be purified, other process parameters can be adversely affected thereby, for example maintaining preset theoretical oxygen values is made considerably more difficult. The velocity of ascension of the particles here is predetermined by the size of the air bubbles formed, but not by the amount of air introduced.

It is an object of the invention to provide conditions for a method for cleaning filtration membrane modules that are used in the treatment of crude water or wastewater or activated sludge in which the deposits caused by the membrane fouling are greatly reduced and mechanical damage to the membranes is substantially avoided. In the context of this object, the operating costs must also be reduced and flow of the wastewaters that are to be purified through the membranes must be kept constant for a relatively long time.

This object is achieved according to the invention in that the filtration membrane module that is to be cleaned is introduced into a cleaning pond/tank or arranged in a filtration pond/tank, flushed by a liquid which contains non-porous biologically resistant particles and set in circulation with gas introduction and in that the deposit situated on outer surfaces of the membranes of the filtration membrane module, termed membrane fouling, is mechanically eroded by the particles.

According to one particular embodiment, a method for treating raw water or wastewater or activated sludge may comprise one or more of the following steps, which are in no particular order:
  Mechanical, physical and chemical pretreatment of the raw water or wastewater or activated sludge,
  Introducing the raw water or wastewater contaminated with biologically active material into a membrane bioreactor system having one or more filtration tanks in which in each case at least one submerged filtration membrane module is arranged,
  Charging the raw water or wastewater or the activated sludge in the filtration tank with particles circulating in the filtration tank,
  Taking off the water purified by the biologically active material, and
  As a special case in applications in which a separate cleaning container is installed: installation of at least one membrane module in the cleaning container, charging the cleaning container with circulating particles.

In another embodiment of the method disclosed herein, the particles that circulate within the filtration tank perform an upward movement induced by gas introduction, in particular by compressed air, and perform a downward movement effected by gravity. Expediently, the non-porous particles consist of inert polymeric material that has a density of 1.0 to 1.5 kg/dm$^3$. The term "inert" is used here and hereinafter synonymously with "biologically resistant" or not degradable by the bacteria in the activated sludge.

According to yet another embodiment of the present disclosure, a method for cleaning a filtration system is disclosed, comprising the steps of:
  At least partially surrounding one or more filtration membrane modules to be cleaned in a housing enclosure structure;
  flushing the one or more filtration membrane modules with a liquid containing non-porous biologically resistant particles;
  circulating the non-porous biologically resistant particles through the liquid and in a manner to achieve contact between the non-porous biologically resistant particles and the one or more filtration membrane modules;
  wherein deposits situated on one or more surfaces of the membranes of the one or more filtration membrane modules are mechanically abraded by the particles, and wherein the particles are of a size sufficient enough to be substantially retained within the housing enclosure structure.

According to yet another embodiment of the present disclosure, a method for cleaning a filtration system is disclosed, comprising a filtration membrane module having a housing enclosure structure surrounding filtration membrane module, the enclosure structure having a multitude of substantially regularly spaced orifices therein, said enclosure containing a plurality of non-porous biologically resistant particles that when set in circulation adjacent the filtration membrane module, deposits situated on outer surfaces of a membrane of the filtration membrane module are mechanically abraded by the particles, wherein the particles are of a size larger than the orifices of the housing enclosure structure so as to restrain such particles within the housing enclosure structure.

The polymeric material is advantageously selected from the group consisting of polypropylene, mineral particle-containing, polycarbonate blends, thermoplastic polyurethane elastomers, poly(methyl methacrylate), poly(butylene terephthalate), polyoxymethylene, polyethylene, poly(vinyl chloride). In particular, the particles have a median diameter between 0.5 mm and 10 mm, and preferably between 2 mm and 4 mm, and most preferably between 3 mm and 3.5 mm, and have one of a generally spherical, elliptical, spheroid, elliptoid, cylindrical, or lenticular shape, or combination thereof.

In order to avoid damage of the sensitive filtration membranes by the particles that are introduced, the roughness of the particles must not exceed a defined measure. According to the invention, particles are used, the surface of which has a median roughness Rtm of less than 40µ, preferably less than 30 and in particular less than 20 The median roughness Rtm is determined by taking the median of the roughnesses Rt (DIN EN ISO 4287) of a plurality of particles.

For treating raw water or wastewater or activated sludge, a membrane bioreactor system having a filtration pond/tank having at least one submerged filtration membrane module is provided. In this case the system is distinguished in that the raw water or wastewater or the activated sludge in the filtration tank contains non-porous, biologically resistant particles.

In an embodiment of the membrane bioreactor, the spacing between two membranes in the filtration membrane module is up to 8 mm and the median diameter of the particles (granules) is less than 5 mm. Advantageously, a feed device for gas, in particular compressed air, is provided for the bottom end of the filtration membrane module, the compressed air streaming of which moves the particles upward between the membranes. The maximum specific area loading of the membranes in the filtration membrane module is 1 to 80 l/(m$^2$×h). It has been found that the permeability as a ratio of the specific area loading of the membrane to the transmembrane pressure in the filtration membrane modules is constant over an operating time of more than 6 months.

The method achieves the advantages that mechanical erosion of the membrane fouling layers proceeds without additional chemical cleaning, that the flow of the liquid that is to be purified through the membranes remains constant over a time period of several months, abrasive damage to the membrane surfaces by particles occurs only to a very slight extent and the operating costs can thereby be reduced, since the intervals for cleaning the membrane surfaces can be extended.

Also, by means of the method, membranes which already have a fouling layer, characterized by a very low permeability and high transmembrane pressures, can be regenerated again by addition of granules. For this purpose the membrane module is installed in a cleaning container and particles that are set in motion are added to the liquid in the cleaning container. The membranes are cleaned within the cleaning container by the particles. The particles can remain in the cleaning tank and be reused, which gives further cost savings. The cleaned membrane modules can then again be installed for the filtration operation.

In various embodiments of the present invention, membrane filters, such as described in U.S. Pat. Nos. 7,892,430 and 5,248,424; U.S. Patent Application Publication Nos. 2011/0042308, 2011/0042312, 2011/0049038, 2011/0127206, 2008/0156730, and 2008/0164208; Japanese Patent Nos. 11-128692, H8-155275, and 2951189; and International Applications PCT/EP2009/002944 and WO 2007/036332 (which are incorporated in their entireties herein by this reference) are enclosed within a water permeable housing and within such housing, small particulate beads and/or pellets are entrained. The enclosure that entrains the beads is preferably permeable to water so as to permit a flow rate therethrough. In a preferred embodiment, a particular grate material is employed, preferably wedge wire available from the Hendrick Screen Company and sold under the trademark Hendrick Tee screen. A Hendrick Drum screen may also be used where the water-current passing the screen is very low. Such a grate material is preferred due to its solid construction characteristics that will withstand the flow pressures within an operating system while at the same time being very effective to retain beads within the enclosure without such beads becoming substantially stuck or lodged within the grate structure itself. Thus, in a preferred embodiment, the enclosure utilized with various embodiments of the present invention entrains bead material in such a manner that such beads do not substantially get stuck in the enclosure surrounding. In various embodiments, a distinct screen material can be employed that has the characteristics of permitting water to pass therethrough while also entraining enclosed beads that surround a membrane filtration system. The enclosure itself can comprise a housing made from various materials, including metals, composites, plastics, etc. and one of skill in the art will appreciate the various design modifications for any particular project in selecting the appropriate enclosure materials to use. Preferably, however, the housing material is made from metal and is of sufficient strength and anti-corrosion characteristics to persist in an aqueous environment for many years without degradation, corrosion or structural failure.

In practice, the beads employed to clean the membrane filters are of a size larger than the orifices of the housing enclosure structure so as to restrain such beads within the desired enclosure. The enclosure itself has dimensions suitable to surround at least one membrane filter, and preferably suitable to surround a plurality of membrane filters provided in a modular system, such that the housed membrane filter, with or without beads included therein, can be readily and reversibly removed from a water treatment environment to facilitate cleaning, retrofitting, modifications, etc. Indeed, in a preferred embodiment, the exterior enclosure and/or housing of the system includes handles or other contact points to permit the removable and moving of the entire enclosure into and out of a water treatment system. For example, suitable attachment points are provided on the enclosure so that a forklift can be utilized to engage such contact points and manipulate the movement of the entire enclosure without damage to the delicate membrane filtration system enclosed therein. Moreover, in various embodiments, there is at least one removable section of the enclosure to permit not only filter membranes residing within such enclosure, but the removal of beads used in the water treatment method, such as after such beads have expired beyond their useful life. As such, at least one side of the enclosure can be reversibly engaged, such as through a conventional latch mechanism so as to permit a hingedly attached portion of the enclosure to be moved to access water membrane filtration modules, replacement of beads, and/or to simply permit access to the interior of the enclosure for any desired purpose.

While the size of beads employed in the present system and method is preferably the sizes as set forth in U.S. Patent Application Publication No. 2011/0042308 to Microdyn-Nadir GmbH or the publication "Beherrschung von Fouling and Scaling an getauchten Filtrationssystemen in Membran-belebungs-anlagen" [Managing fouling and scaling on submerged filtration systems in membrane activation systems] by VA TECH WABAG GmbH, Vienna, editor: F. Klegraf. In other embodiments a wider selection of bead particular sizes is employed in order to address distinct debris issues that may arise in water treatment facilities. As such, the particular enclosure materials employed will take into account the smallest bead size that will be used in order to ensure that the majority, if not all, of the beads employed in such a system are retained within the enclosure when the water filtration system is in use.

In practice, the enclosure described in the present invention enables the water filtration method to be carried out in a fashion so that the vast majority of beads are not freely floating throughout the water clarifier in which the membrane filters are conventionally employed. Instead, the water clarifier is largely devoid of free floating beads, with such beads being entrained within an enclosure that also encloses the water membrane filters.

In various embodiments, more than one of the enclosures is employed in a water treatment system. Such enclosures can themselves be provided in a plurality of design orientations such that at least two and preferably at least three separate modules are slidably and vertically engageable into a water clarifier such that water flowing through the clarifier experiences a series of such enclosures, each enclosure having a water filtration filter enclosed therein. Such an aspect of the invention permits the use of slightly different membrane filter systems to be employed in a series. For example, it may be advisable in certain environments to have a more porous membrane filter employed initially to remove larger debris and contaminants from water, followed by other membrane filters along the flow of the water, with such other membrane filters being of a finer quality, thus removing smaller debris and contaminates. Various membranes and membrane permeability may be used in the present invention. Such membranes may be of the type similar to those described in "A Review of Reverse Osmosis Membrane Materials for Desalination—Development to Date and Future Potential" by Lee, et al. published in volume 370 of the *Journal of Membrane Science* (Mar. 2011), or "Water Permeability and Water/Salt Selectivity Tradeoff in Polymers for Desalination" by Geise, et al. published in volume 369 of the *Journal of Membrane Science* (2011). Accordingly, various enclosure screen sizes together with various bead shapes and sizes can be used with the different membrane filters. For example, a very porous membrane filter may be used with an enclosure screen with larger orifices than the orifices of the enclosure screen for less porous membrane filter.

In various embodiments of the present invention, a water filtrations system is provided, the filtration system comprising a cascade aeration design. In one embodiment, a wedgewire or "Hendrick screen" is provided for removing contaminants. The screen is periodically impacted with a combination of air and/or beads for impinging the surface of the screen. The beads may aid in cleaning the surface of the screen and/or the surface of the membrane filter. The air may also scour the beads and move them along the screen and/or membrane filter.

In various embodiments, beads or impingement particles of the present invention comprise polypropylene beads. The beads generally comprise a density greater than water such that they gradually sink when placed in water. Preferably, beads comprise a density of about 1.05 times that of water, such that sinking of the beads occurs slowly. Additionally, as the beads collect debris from the membrane filter and screen, the beads may become more or less dense depending upon the type of debris; therefore the debris should be considered in the design.

As used herein, the term "beads" is meant to generally refer to particles or devices for impacting filter elements. Accordingly, this term should not be read as being limited to any particular size or geometry of device. It is contemplated that beads of the present invention may comprise any number of shapes and/or arrangements and may, but need not be, of a spherical shape.

In various embodiments, wedgewire screens of the present invention are impacted with an air stream at a small or low angle, such that the air stream can effectively move beads along at least one dimension of the screen. In this manner, beads may be scoured or moved along the screen in a manner that allows for the beads to perform mechanical cleaning functions.

In one embodiment, a pressure differential is applied across a screen in at least one dimension to facilitate migration of beads across the screen's surface. A pressure differential may be applied across a single direction. Alternatively, a non-linear pressure differential or a plurality of pressure differentials may be applied over a screen to direct beads and additional cleaning elements across the screen and/or to direct the water across the membranes.

In various embodiments, beads or impingement particles of the present invention comprise magnetic beads such that when a magnetic field is induced upon the system within the enclosure screen and/or the filtration system, the beads will slowly move along the membrane filter and the screen to mechanically clean the filter and screen. Additionally, when a magnetic field is not induced upon the system within the enclosure screen and/or the filtration system, the beads will rest at the bottom of the filtration tank and thus not impede the water flow. The speed of the beads, in any direction relative to the membrane filter and screen, can be controlled by the strength of the magnetic field.

In various embodiments, airbursts are periodically used to clean the screen and/or beads. The airbursts may be applied to a screen in addition to, or in lieu of, various other cleaning elements of the present invention. An airburst system, such a Hendrick Airburst System, is employed in a preferred embodiment.

In an embodiment, the enclosure screen, preferable wedgewire, uses fine bubble air scour to clean the screen and/or the membrane filter. In this embodiment, the cleaning oxygen serves as the mechanical cleaning process.

In practice, if a system uses both (1) air or oxygen is used to move the beads along the screen and membrane or to clean the screen and membrane and (2) the MBR method with biomass to eliminate some pollutants, then one of the chambers or tanks in the filtration system can be eliminated because aeration and filtration can be performed together in one tank. The air or oxygen is used to move the beads, scour the beads, and clean the enclosure screen. Additionally, the air or oxygen aerates the water in the chamber to replenish oxygen consumed by the biomass. Therefore, separate aeration and filtration chambers are not needed.

The preferred embodiment of the present invention uses vertical filters when combining the MBR method with bead- or air-scouring mechanical cleaning because vertical filters have increased oxygen input and therefore tend to have higher nitrification, whereas horizontal filters have decreased oxygen input and are used for denitrification, as discussed in the 2008 paper by M. Wichern, C. Lindenblatt, M. Lubken, and H. Horn called "Experimental results and mathematical modeling of an autotrophic and heterotrophic biofilm in a sand filter treating landfill leachate and municipal wastewater," published in *Water Research* (42): 3899-3909 (incorporated herein by this reference in its entirety). Denitrifying bacteria grow in the anaerobic conditions created deep in the center of the biofilm, while nitrifying bacteria grow in the outer, aerobic part of the biofilm, as discussed in the 2008 article by L. S. Downing and R. Nerenberg called "Total nitrogen removal in a hybrid, membrane-aerated activated sludge process," published in *Water Research* (42): 3697-3708 (incorporated herein by this reference in its entirety). The advantages of the MABR system include energy-saving passive aeration, reduced tank volume, and the elimination of internal water recycling. Challenges found in using such a system include competition between the nitrifying and denitrifying bacteria, which leads to a reduction in nitrification and denitrification.

One skilled in the art may combine various aspects of the different embodiments described herein to make alternate embodiments not specifically described herein.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

In the drawings:

FIG. 1a shows a filtration tank and a filtration membrane enclosure screen;

FIG. 1b shows a bead containing housing module and a filtration membrane module;

FIG. 2a shows a schematic depiction of a membrane bioreactor system having a filtration system similar to the filtration system shown in FIG. 1a;

FIG. 2b shows a schematic depiction of a membrane bioreactor system having a filtration system similar to the filtration system shown in FIG. 1b;

FIG. 3 is a perspective view of an embodiment of a filtration assembly including a plurality of vertically-aligned filtration modules aligned along the lateral edges of individual membrane sheets and an aeration device located below the filtration modules;

FIG. 4 shows a diagram of the permeability of the membranes of a filtration membrane system over time;

FIG. 5 shows a diagram of the decrease in permeability of a filtration membrane system and the permeability after cleaning;

FIG. 6a shows an enclosure screen or housing material according to one particular embodiment of the present disclosure;

FIG. 6b shows a cross-sectional view of a screening or filtering element of the housing shown in FIG. 6a; and FIG. 6c shows a cross-sectional view of another screening or filtering element of the housing shown in FIG. 6a.

FIG. 7 shows a table (Table 1) that provides criteria for particle/granule selection in terms of density, diameter, shape and material.

DETAILED DESCRIPTION

Figure 1A:
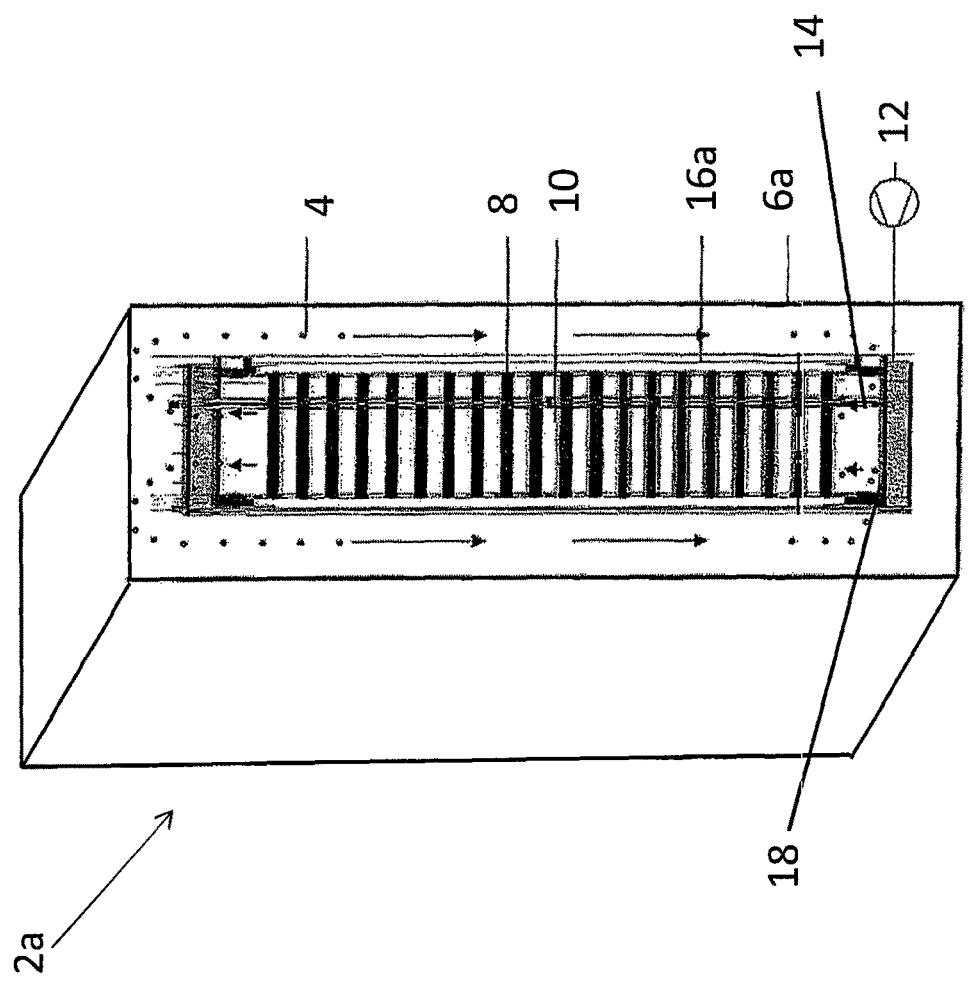

FIG. 1a depicts a filtration system 2a comprising a filtration tank 6a and an enclosure screen 16a. As shown, one or more membranes 8, 10 are provided for continuous filtration of particulates and contaminations from water, for example. In an embodiment, there is a pressure differential between the membranes 8, 10 to make the water flow through the membranes 8, 10. In an embodiment, the bottom section of the enclosure screen 16a is a wedgewire screen 18. An air or water stream 14, which is passed through the wedgewire screen 18 and along the membranes 8, 10 and the enclosure screen 16a, comprises a plurality of beads 4 for mechanical and/or abrasive cleaning of the enclosure screen 16a and membranes 8, 10. A feed device 12 for gas, in particular for compressed air, is at the bottom end of or just below the enclosure screen 16a. The gas or air bubbles ascending from the feed device 12 flow up between the membranes 8, 10 enclosed in the enclosure screen 16a and carry with them the beads 4. After the beads 4 reach the top of the membrane 8 or 10, they exit the enclosure screen 16a and slowly sink down to the bottom of the filtration chamber or tank 6a by means of gravity because the beads 4 are slightly denser than water, between 1.0 and 1.5 kg/dm'. Preferably the density of the bead material is 1.00 to 1.40 kg/dm$^3$, and in particular the density of the bead material has a value from 1.00 to 1.10 kg/dm$^3$.

In various embodiments, the present invention comprises an enclosure for surrounding the membrane filters of a filtration system. As shown in FIG. 1a, the enclosure screen 16a operates as a membrane-housing module, such that beads 4 provided in the filtration system 2a are in close contact with the membranes and to protect the membranes from damage inflicted by large particles (other than the beads 4). In an embodiment the wedgewire screen 18 is at a slight angle to aerate the enclosure screen 16a and the membranes 8, 10. The wedgewire screen 18 can also direct the airstream 14 and the beads 4. The air from the gas feed device 12 may also use an airburst and/or an airburst system (not shown) to periodically clean the wedgewire screen 18, enclosure screen 16a, membranes 8, 10, and beads 4.

The enclosure screen 16a is preferably permeable to liquids, such that water or fluid may pass through the enclosure screen 16a substantially unobstructed and such that filtration operations are not impeded by the presence of the novel enclosure. In a preferred embodiment, the enclosure screen 16a is a wedgewire screen.

To ensure that the enclosure screen 16a does not substantially obstruction the flow of water or fluid nor obstruct the filtration process, the enclosure screen 16a must be cleaned periodically to remove any build-up on the enclosure screen 16a.

Figure 1B:
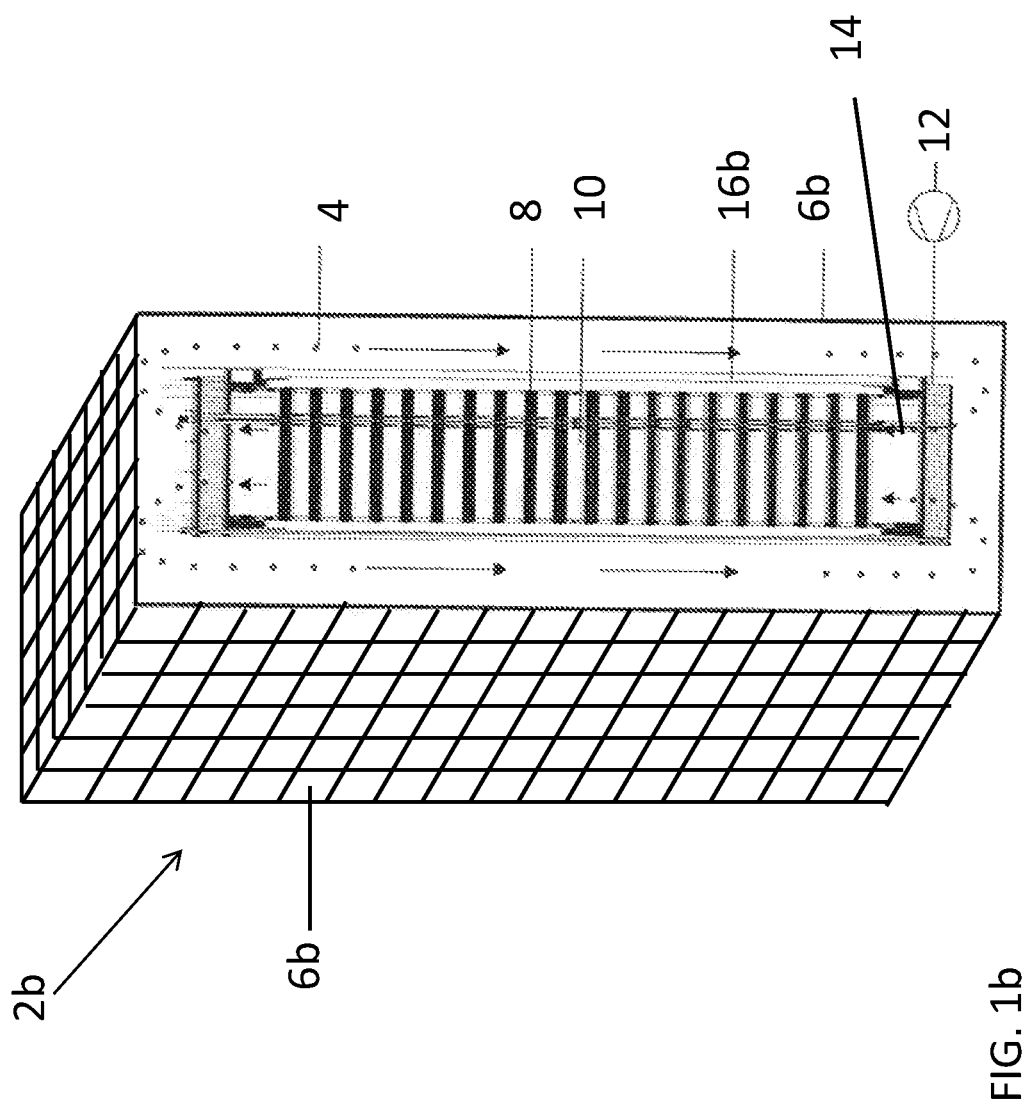

FIG. 1b depicts a filtration system 2b comprising a bead containing housing module 6b and a filtration membrane module 16b. In an embodiment, the bead containing housing module 6b is a birdcage-like screen. As shown, one or more membranes 8, 10 are provided for continuous filtration of particulates and contaminations from water, for example. An air or water stream 14, which is passed through and/or along the membranes 8, 10 and the filtration membrane module 16b, comprises a plurality of beads 4 for mechanical and/or abrasive cleaning of the filtration membrane module 16b and membranes 8, 10. A feed device 12 for gas, in particular for compressed air, is at the bottom end of the filtration membrane module 16b. The gas or air bubbles ascending from the feed device 12 flow up between the membranes 8, 10 of the filtration membrane module 16b and carry with them the beads 4. After the beads 4 reach the top of the membrane 8 or 10, they exit the filtration membrane module 16b slowly sink down to the bottom of the bead containing housing module 6b by means of gravity because the beads 4 are slightly denser than water, between 1.0 and 1.5 kg/dm$^3$. Preferably the density of the bead material is 1.00 to 1.40 kg/dm$^3$, and in particular the density of the bead material has a value from 1.00 to 1.10 kg/dm'. As the beads 4 sink, they mechanically and/or abrasively clean the bead containing housing module 6b.

In various embodiments, the present invention comprises an enclosure for surrounding a filtration system. As shown in FIG. 1b, the enclosure operates as a bead containment housing module 6b, such that beads 4 provided in the filtration system 2b are not lost to the outside environment or other portions of the system where they may not be recoverable. The housing module is preferably permeable to liquids, such that water or fluid may pass through the housing module substantially unobstructed and such that filtration operations are not impeded by the presence of the novel enclosure. In a preferred embodiment, the housing module is a screen, preferable a wedgewire screen.

To ensure that the housing module does not substantially obstruction the flow of water or fluid nor obstruct the filtration process, the housing module must be cleaned periodically to remove any build-up on the housing module.

Figure 2A:
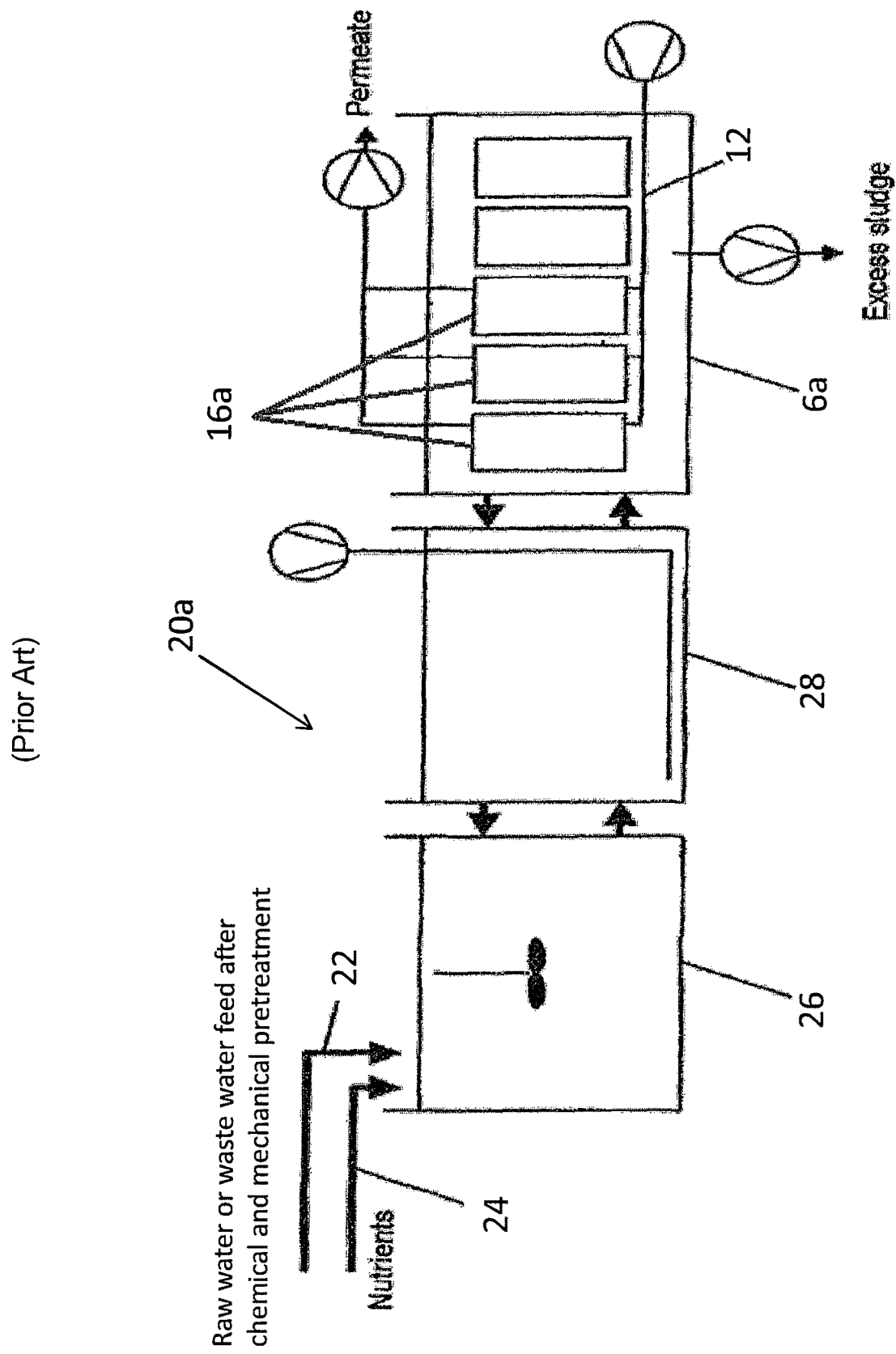

FIG. 2a shows schematically a membrane bioreactor system 20a for treating raw water or wastewater, a denitrification appliance 26, a nitrification appliance 28, and a filtration tank 6a in which a plurality of enclosure screens 16a are situated. In the denitrification appliance 26, via a feed line 22, raw water or wastewater is introduced after it was previously chemically and mechanically pretreated. In addition, via a line 24, nutrients pass into the activation stage. In the filtration tank 6a are arranged, for example, five enclosure screens, of which three enclosure screen modules 16a are in operation. The enclosure screen modules 16a are explained in accordance with FIG. 1a. These three enclosure screens 16a are exposed to compressed air via a feed device 12 for gas, in particular for compressed air, at the bottom end of the respective enclosure screens 16a. Via a pump, the excess sludge is transported out of the filtration tank 6a. The top ends of the enclosure screens 16a are connected to a return line for the raw water or wastewater. In addition, the water that is purified by the biologically active material is taken off from the filtration tank by means of a pump in the permeate line.

Figure 2B:
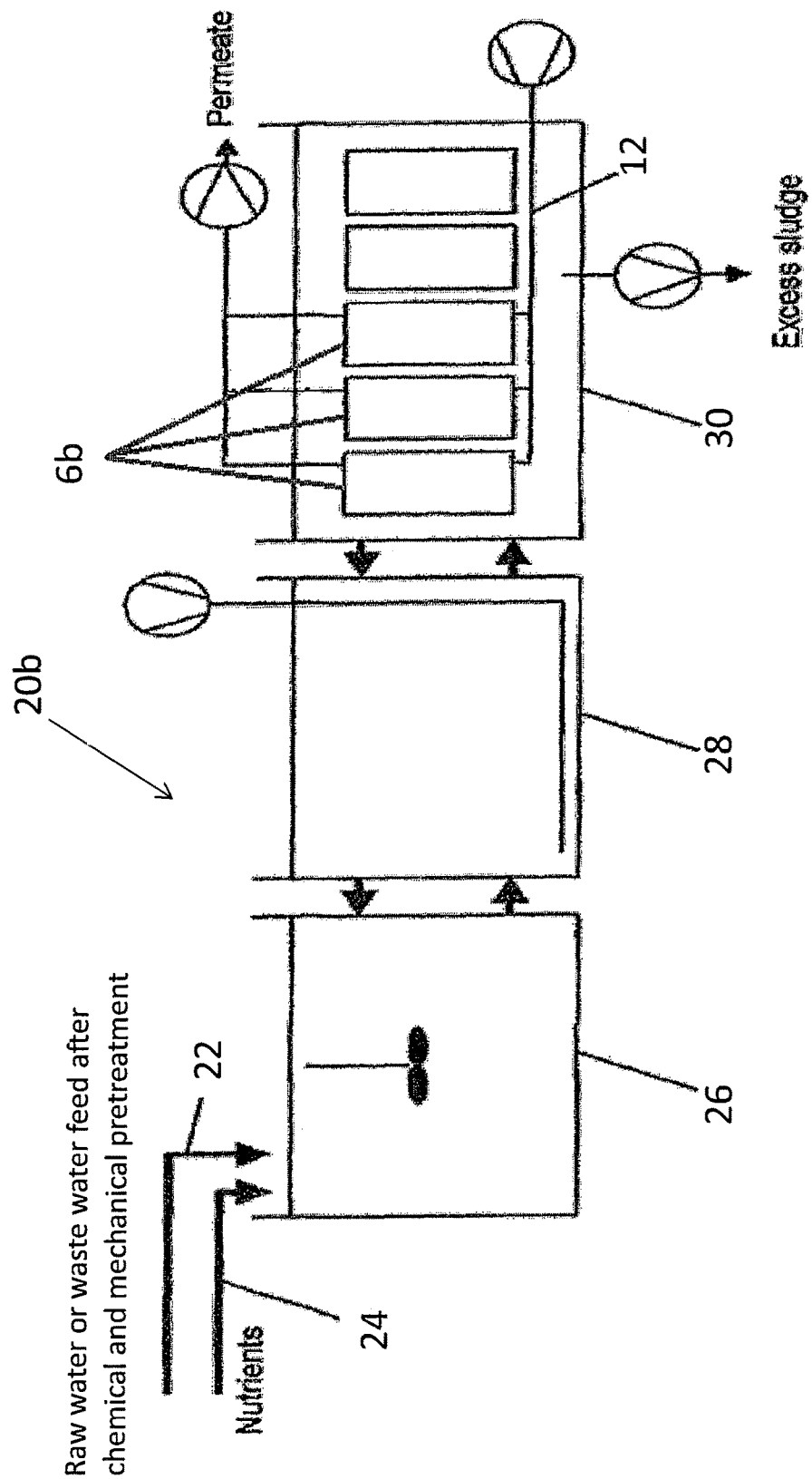

FIG. 2b shows schematically a membrane bioreactor system 20b for treating raw water or wastewater, a denitrification appliance 26, a nitrification appliance 28, and a filtration tank 30 in which a plurality of enclosure screens, also called bead containing housing modules, 6b are situated. In the denitrification appliance 26, via a feed line 22, raw water or wastewater is introduced after it was previously chemically and mechanically pretreated. In addition, via a line 24, nutrients pass into the activation stage. In the filtration tank 30 are arranged, for example, five bead containing housing modules, of which three bead containing housing modules 6b are in operation. The bead containing housing modules 6b are explained in accordance with FIG. 1b. These three bead containing housing modules 6b are exposed to compressed air via a feed device 12 for gas, in particular for compressed air, at the bottom end of the respective bead containing housing modules 6b. Via a pump, the excess sludge is transported out of the filtration tank 30. The top ends of the bead containing housing modules 6b are connected to a return line for the raw water or wastewater. In addition, the water that is purified by the biologically active material is taken off from the filtration tank 30 by means of a pump in the permeate line.

Figure 3:
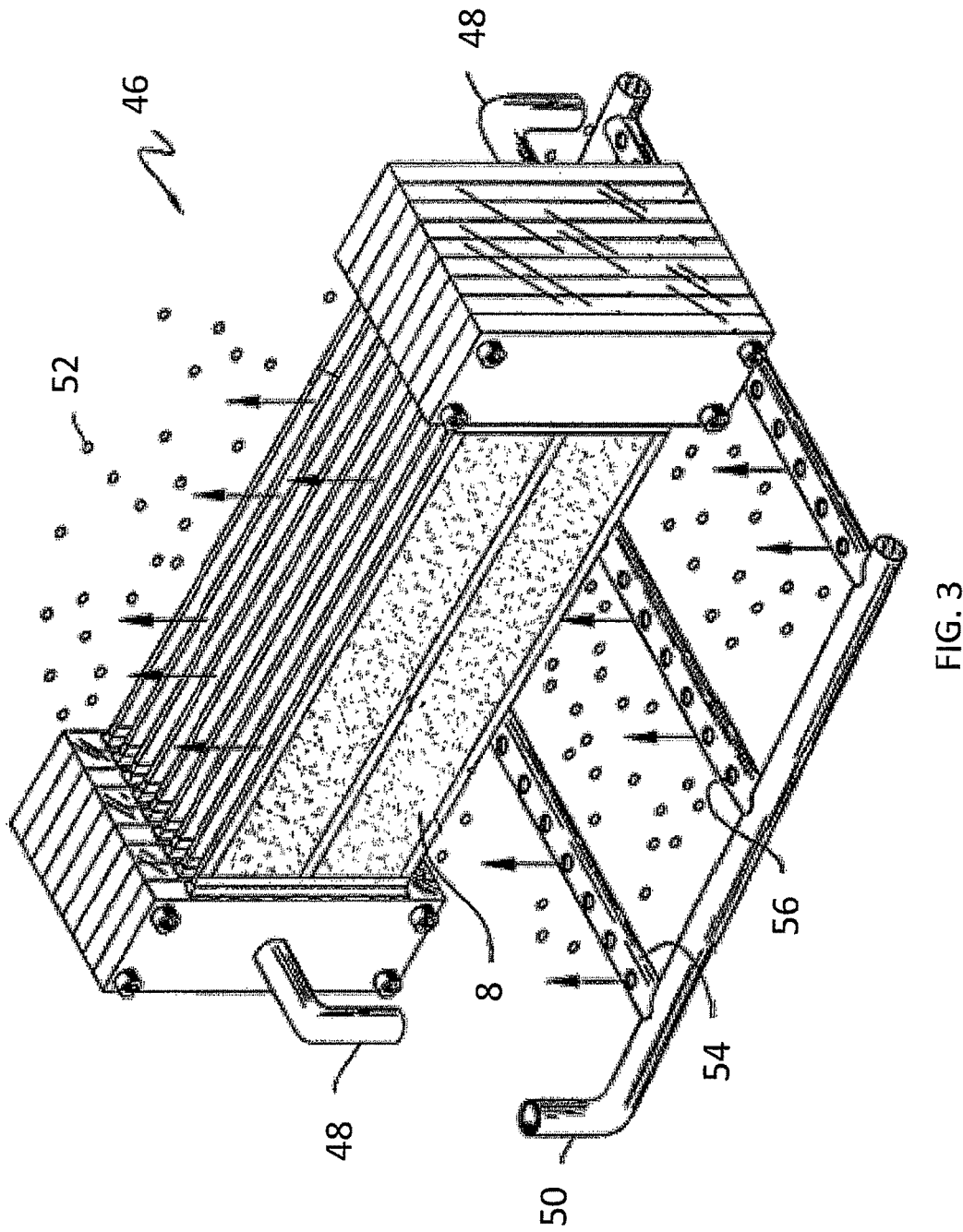

FIG. 3 illustrates an embodiment of a filtration assembly 46 generally shown, submerged in a body of feed water which is subject to ambient pressure, such as a pond or open tank. The filtration assembly 46 comprises a plurality of filtration modules positioned in side-by-side arrangement with spacing between vertically-aligned membrane sheets 8. The average spacing between the surfaces of membrane sheets 8, preferably from about 2 to 12 mm, defines a fluid flow pathway generally indicated by upwardly pointing arrows. More preferably, the average spacing between the surfaces of the membrane sheets 8 are from 3 to 7 mm, which must be slightly larger than the diameter of the cleaning beads. In other embodiments, the average spacing is less than 6 mm and in some embodiments less than 4 mm. The spacing between adjacent membrane sheets is preferably uniform, i.e. deviating from the spacing at the header by less than 50% and more preferably less than 25%. As will be subsequently described, the fluid flow pathway is unconfined along the top edges of the individual membrane sheets 8. Permeate outlets 48 extending from terminal headers on each end of the assembly provide routes for transferring permeate from the filtration modules. In one preferred embodiment, the permeate outlet 48 is in fluid communication with a pump (not shown) which creates negative pressure (vacuum), and which draws permeate from the headers. The negative pressure is communicated to the outer surfaces of the membrane sheets and creates a transmembrane pressure necessary for filtration. That is, negative pressure generated by a pump creates a transmembrane pressure which induces flow of permeate through the porous structure of the membrane sheet, to the chambers of individual headers, through the permeate outlet 48 where permeate can then be collected, stored or used. By reversing the pressure generated by the pump, or by use of a separate pump, stored permeate may be backwashed through the filtration assembly.

The filtration assembly may optionally include an aeration device 50 located below the filtration modules for delivering gas bubbles 52 generated by an external pump and gas source (not shown) into the feed source. The gas (preferably air) bubbles are delivered to the feed source by a series of pipes 54 with apertures 56 or nozzles. As the bubbles 52 exit the apertures 56, they rise vertically within the feed source along the fluid flow pathway defined by the spacing between vertically-aligned membrane sheets. As the bubbles 52 pass along the fluid flow pathway, they effectively scrub the outer surfaces of the membrane sheets and at least partially remove accumulated solids from the porous structure of the membrane sheets. The bubbles 52 may also carry beads (not shown) to mechanically and/or abrasively clean the filtration membrane modules and membranes 8, 10.

Although the description herein is made particularly to an aerobic membrane bioreactor, it is expressly understood that the embodiments described herein may work with an anaerobic membrane bioreactor as well. Other membrane types and filtration devices may be cleaned using the system and method of the present disclosure, in its varying embodiment.

The filtration assembly preferably has a relatively high packing density. More specifically, the assembly preferably has a membrane specific surface area of at least 150/m, and in some embodiments at least 200/m. For purposes of the present description, the term "specific surface area" means the active membrane area of the assembly per unit volume. The "active membrane area" means the outer surfaces of the membrane which are porous and in fluid communication with the capillary channels. Thus, the use of non-porous laminates, support edges and reinforcing strips are excluded from the "active membrane area". The volume of the assembly includes the region within the edges of the membranes sheets (located between the terminal membrane sheets at each end of the assembly). Thus, the volume includes the spacing between individual membrane sheets 8. The use of the present membrane sheets allows for closer spacing of membrane sheets.

Figure 4:
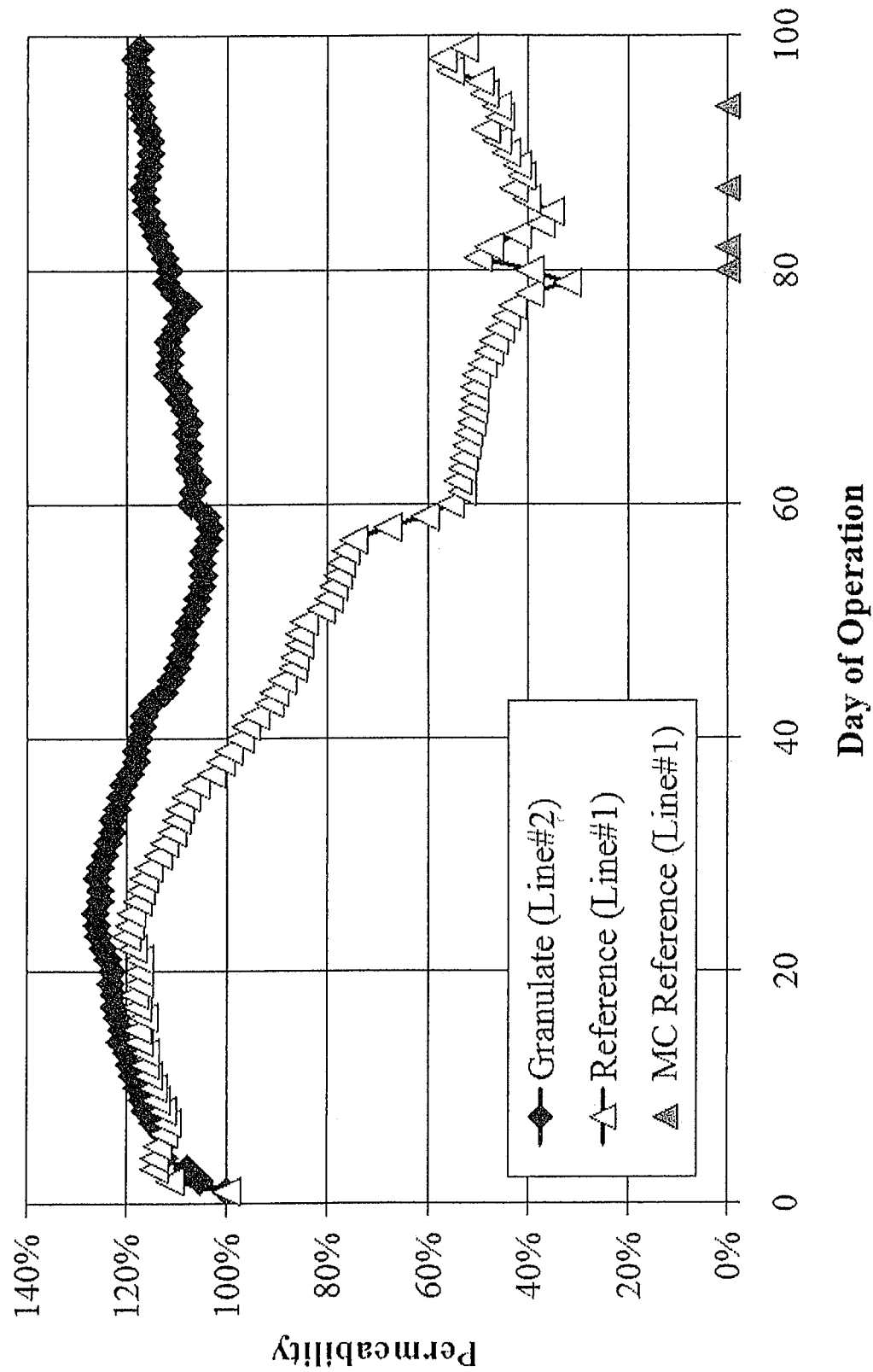

FIG. 4 shows the permeability of all enclosure screens 16a or bead containing housing modules 6b over time. All modules began with a permeability in the range from 400 to 500 $l/(m^2 \cdot h \cdot bar)$ (initial permeability 100%). It may clearly be seen that the permeability remains constant over a period of several months in the enclosure screens 16a or bead containing housing modules 6b with PP granules. The permeability in the enclosure screens 16a or bead containing housing modules 6b during the experimental phase reduced in the course of 2.5 months to about 40% of the initial permeability. By means of weekly in-situ cleaning, the permeability could readily be increased to about 50% of its initial permeability.

By adding about 0.5 to 1.0 $kg/m^3$ of granules in the reference train, the cleaning action of the granules could be demonstrated. In the course of four days, the permeability increased to its initial state (FIG. 4).

Figure 5:
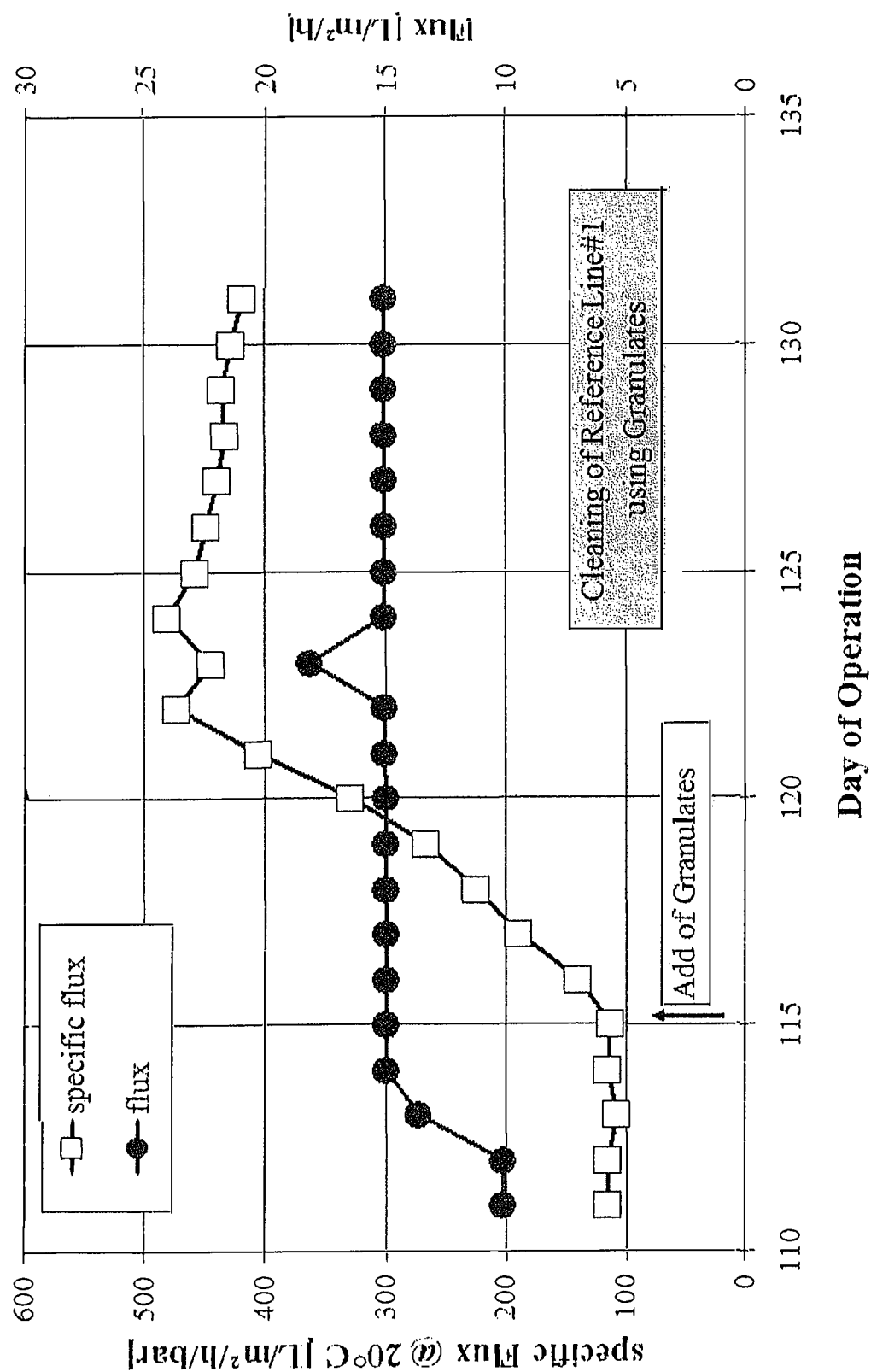

FIG. 5 shows the result of a cleaning. Cleaning of membranes already bearing a fouling layer is possible. A filtration membrane module that had a permeability of only 20% of its initial permeability was treated with air in a cleaning tank with water and an addition of 1 to 10 kg/m$^3$, in particular about 3 to 5 kg/m$^3$, of granules over about 10 to 14 hours in such a manner that the particles circulated. After completion of cleaning, the module was again put in operation and exhibited its initial permeability.

Figure 6A:
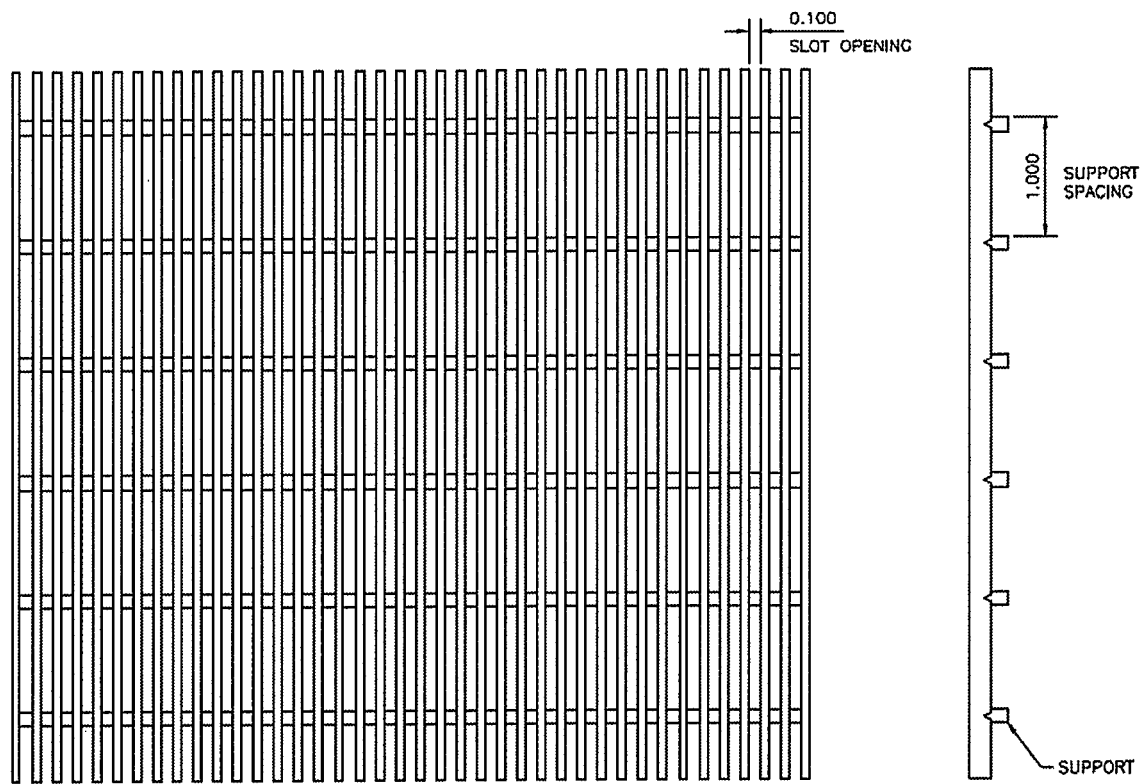
Figure 6B:
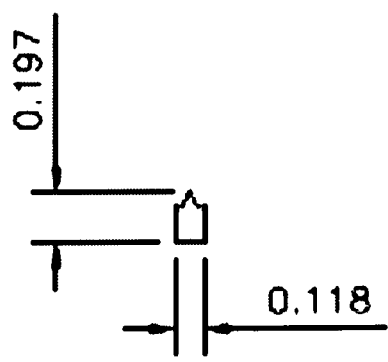
Figure 6C:
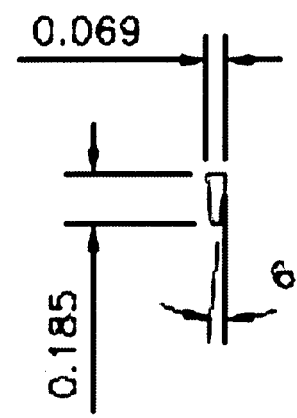

Referring now to FIGS. 6a-6c, one enclosure screen material in a preferred embodiment is shown. FIG. 6a shows a wedgewire screen having a plurality of supports, which support a plurality of wires spaced apart to form a plurality of regularly spaced orifices. The plurality of wires are preferably spaced apart so as to contain substantially all of the plurality of non-porous biologically resistant particles within the housing enclosure.

As shown in FIG. 6c, the wires are preferably triangular in shape and oriented so that the smallest leg of the triangle faces towards the interior of the housing enclosure (i.e., FIG. 6a depicts the enclosure screen material in a top view, the top view being the side facing inwardly when assembled to surround the membrane modules). This orientation ensures that any non-porous biologically resistant particles that inadvertently escape through the wedgewire screen do not become trapped between the wires, thereby impeding the circulation of liquid through the wedgewire screen and any pressure differential created through the housing enclosure. Other shaped wires may achieve this same result without departing from the spirit of the disclosure.

Although the present disclosure is described as a system and method for primarily treating a membrane bioreactor system, it is expressly understood that other types of filtration apparatus may be cleaned using the systems and methods described herein. For example, the filtration systems described in U.S. Pat. Nos. 7,435,351, 7,223,247, 7,143,781, which are incorporated by reference herein in their entireties, are considered within the scope of the present disclosure and may be used in conjunction with the systems and methods of the present application.

Although not shown in the drawing figures, the particles that are described herein are important for the system and method described in this disclosure. The particles are preferably selected from the group consisting of polypropylene—mineral filled or mineral particle-containing, polycarbonate blends, thermoplastic polyurethane elastomers (TPE), poly(methyl methacrylate), poly(butylene terephthalate), polyoxymethylene, polyethylene, poly(vinyl chloride). The particles should have a median diameter between 0.5 mm and 10 mm, and preferably between 2 mm and 4 mm, and most preferably between 3 mm and 3.5 mm. The particles preferably have one of a generally spherical, elliptical, spheroid, elliptoid, cylindrical, or lenticular shape, or combination thereof. The preferred density of the particles is between 1.0 g/ml and 1.10 g/ml, and most preferably 1.05 g/ml.

It was found that in the method for treating raw water or wastewater by using particles in the filtration tanks, the control of the formation of membrane fouling layers is reinforced. It was found that the beneficial effect of the particles used and the basic function of treating the raw water or wastewater which is to separate the biomass and purified water from one another is achieved. The costs of the chemical cleaning can be reduced by the method according to the invention. Likewise, the effect on the environment is less lasting, since fewer chemicals are liberated and therefore the potential for byproducts such as, for example, absorbable organic halogen compounds, is reduced.

While various embodiment of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. For further illustration, the description of the claimed invention as encompassed in the Claims appended hereto are expressly made a part of this disclosure and incorporated by reference herein in their entirety.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for cleaning filtration membrane modules, comprising:

providing at least two removable housing structures having one or more filtration membranes inside, said one or more filtration membranes each having four sides, a top and a bottom, with each of said at least two removable housing structures having a screen that entirely surrounds one or more filtration membranes on all of said four sides and on said top and on said bottom, said at least two removable housing structures comprising at least four vertically extending panels on each side of said one or more filtration membranes and a horizontally extending top and a horizontally extending bottom, said removable housing structure, adapted to be positioned within a basin for containing wastewater;

positioning said at least two removable housing structures in said basin;

flushing the one or more filtration membranes with a liquid containing biologically inert particles;

cleaning the filtration membrane modules by circulating the biologically inert particles through the liquid and in a manner to achieve contact between the biologically inert particles and the one or more filtration membranes, said biologically inert particles impacting both sides of said one or more filtration membranes simultaneously during said circulating step;

wherein deposits situated on one or more surfaces of the one or more filtration membranes are mechanically abraded by the biologically inert particles, and wherein the biologically inert particles are of a size able to be retained within the at least two removable housing structures;

wherein during said circulating step, said biologically inert particles impact each of the four sides and top and bottom of the at least two removable housing structures, and wherein said screen has openings that permit fluid to flow therethrough, said at least two removable housing structures being devoid of any opening through which said biologically inert particles can escape during said circulating step; and wherein said at least two removable housing structures operate as a containment module that prevents said plurality of biologically inert particles from being lost to the environment outside to said at least two removable housing structures.

2. The method as set forth in claim 1, further comprising providing a feed device for gas to move said plurality of biologically inert particles upward along an outer surface of the one or more filtration membranes.

3. The method as set forth in claim 1, wherein said screen is a wedgewire screen.

4. The method as set forth in claim 1, wherein the biologically inert particles are non-porous and have a density between 1.0 g/ml and 1.10 g/ml.

5. The method as set forth in claim 1, wherein said plurality of biologically inert particles are ellipsoid in shape and are approximately 2 mm to 4 mm in diameter.

6. A method for cleaning filtration membrane modules, comprising:

providing at least two removable housing structures having one or more filtration membranes inside, said one or more filtration membranes each having four sides, a top and a bottom, with each of said at least two removable housing structures having a screen that entirely surrounds one or more filtration membranes on all of said four sides and on said top and on said bottom, said at least two removable housing structures comprising at least four vertically extending panels on each side of said one or more filtration membranes and a horizontally extending top and a horizontally extending bottom, said removable housing structure, adapted to be positioned within a basin for containing wastewater;

positioning said at least two removable housing structures in said basin;

flushing the one or more filtration membranes with a liquid containing biologically inert particles;

cleaning the filtration membrane modules by circulating the biologically inert particles through the liquid and in a manner to achieve contact between the biologically inert particles and the one or more filtration membranes, said biologically inert particles impacting both sides of said one or more filtration membranes simultaneously during said circulating step;

wherein deposits situated on one or more surfaces of the one or more filtration membranes are mechanically abraded by the biologically inert particles, and wherein the biologically inert particles are of a size able to be retained within the at least two removable housing structures;

wherein during said circulating step, said biologically inert particles impact each of the four sides and top and bottom of the at least two removable housing structures, and wherein said screen has openings that permit fluid to flow therethrough, said at least two removable housing structures being devoid of any opening through which said biologically inert particles can escape during said circulating step; and wherein said at least two removable housing structures comprise a forklift attachment utilized to engage and manipulate said at least two removable housing structures without damage to the one or more filtration membranes housed therein.

7. The method as set forth in claim 6, wherein said screen is a wedgewire screen.

8. The method as set forth in claim 6, wherein the biologically inert particles are non-porous and have a density between 1.0 g/ml and 1.10 g/ml.

9. The method as set forth in claim 6, further comprising providing a feed device for gas to move said plurality of biologically inert particles upward along an outer surface of the one or more filtration membranes.

10. The method as set forth in claim 6, wherein said at least two removable housing structures comprise handles and further comprising removing said at least two removable housing structures using said handles.

11. The method as set forth in claim 6, wherein said plurality of biologically inert particles are ellipsoid in shape and are approximately 2 mm to 4 mm in diameter.

12. A system for cleaning a filtration membrane module, comprising at least two removable housing structures that each include a filtration membrane, each of said at least two removable housing structures completely surrounding said filtration membrane, each of said at least two removable housing structures having a screen on each of four sides, top and bottom of said at least two removable housing structures, said at least two removable housing structures containing a plurality of biologically inert particles that when set in circulation adjacent the at least two filtration membranes, cleaning the filtration membrane modules by mechanically abrading deposits situated on outer surfaces of the at least two filtration membranes, wherein said plurality of biologically inert particles are of a size larger than regularly spaced orifices of the at least two screens so as to restrain the biologically inert particles within the at least two removable housing structures; and wherein the at least two removable housing structures are devoid of any opening through which said plurality of biologically inert particles can escape; and wherein said plurality of biologically inert particles are non-porous, are approximately 2 mm to 4 mm in diameter, and have a density between 1.0 g/ml and 1.10 g/ml.

13. The system as set forth in claim 12, wherein said at least two removable housing structures comprise handles to permit the removal of said at least two removable housing structures.

14. The system as set forth in claim 12, wherein said one or more filtration membranes are reversibly removable from said at least two removable housing structures.

15. The system as set forth in claim 12, wherein said screen is a wedgewire screen.

* * * * *